United States Patent [19]
Wolowodiuk et al.

[11] 3,830,292
[45] Aug. 20, 1974

[54] FLOW DISTRIBUTION FOR HEAT EXCHANGERS

[75] Inventors: Walter Wolowodiuk, New Providence; Bruce Edgar Dawson, Chatham; John Anelli, Parsippany, all of N.J.

[73] Assignee: The United States of America as represented by the United States Atomic Energy Commission, Washington, D.C.

[22] Filed: May 1, 1972

[21] Appl. No.: 248,955

[52] U.S. Cl. ..................... 165/161, 165/40, 122/32
[51] Int. Cl. .............................................. F28f 9/22
[58] Field of Search ..................... 165/158–162; 122/32, 510

[56] References Cited
UNITED STATES PATENTS

| | | | |
|---|---|---|---|
| 1,524,595 | 1/1925 | Sward | 165/161 |
| 1,883,605 | 10/1932 | Davy | 165/161 |
| 2,411,097 | 11/1946 | Kobb | 165/161 X |
| 3,182,719 | 5/1965 | Christ | 165/159 X |
| 3,566,961 | 3/1971 | Lorenz | 165/159 |

*Primary Examiner*—Charles J. Myhre
*Assistant Examiner*—Theophil W. Streule, Jr.
*Attorney, Agent, or Firm*—John E. Wilson; Marvin A. Naigur

[57] ABSTRACT

A heat exchanger where one fluid is flowed over tubes carrying another fluid to place said fluid in indirect heat exchange in which problems of erosion, temperature gradient, and vibrations at the area where the tubes are joined to a tube sheet are eliminated. A fluid inlet spaced from the tube sheet feeds fluid into an annular flow chamber which encircles the tubes and has an annular perforated plate closer to the tubes than the inlet and perforated so that the resistance to flow of fluid through the plate at different locations on it is a function of the distance from the inlet.

3 Claims, 2 Drawing Figures

# FLOW DISTRIBUTION FOR HEAT EXCHANGERS

SOURCE OF THE INVENTION

This invention was made in the course of or under a contract with the United States Atomic Energy Commission.

BACKGROUND OF THE INVENTION

Probably the most common type of heat exchanger in use today is one where one fluid is flowed over tubes carrying another fluid to place the two fluids in indirect heat exchange. The fluid which flows through the tubes is led in a large stream to a tube sheet where it separates into smaller streams, each of which flows through a hole in the tube sheet and one of the tubes on the other side of the sheet.

The fluid which flows over the tubes is often introduced at a point close to the tube sheet. This can create problems because many heat exchange fluids, such as liquid sodium, are erosive and it is desirable to prevent any erosion at the tube sheet in order to prevent failure where the tubes are joined to the tube sheet. Further, if incoming fluid is allowed to impinge directly against the tubes, it can cause harmful vibration in the tubes which can result in failure. Another problem which is created by allowing fluid to impinge directly against the tubes and then to flow across other tubes is that temperature differences would be created between the said tubes. For example, if the tubes are carrying cooling fluid and heating fluid impinges across the outer tubes in a large tube bundle, the heating fluid will be cooled before it comes into contact with some of the tubes to heat them. This will cause differences in the amounts of heat which are transferred to the cooling fluid which can result in loss of efficiency, capacity and possible tube failure.

SUMMARY OF THE INVENTION

It is an object of the present invention to overcome drawbacks found in the prior art such as those discussed above. Accordingly, a heat exchanger is provided with a tube sheet, a plurality of tubes extending from it in one direction, a fluid inlet spaced from said tube sheet in that direction, an annular flow chamber encircling the tubes and in communication with the fluid inlet, the chamber having an annular plate which is perforated so that the resistance to flow of the fluid through the plate at different locations on it is greater the longer the distance from the inlet.

DETAILED DESCRIPTION OF THE PREFERRED EMBODIMENT

Figure 1:
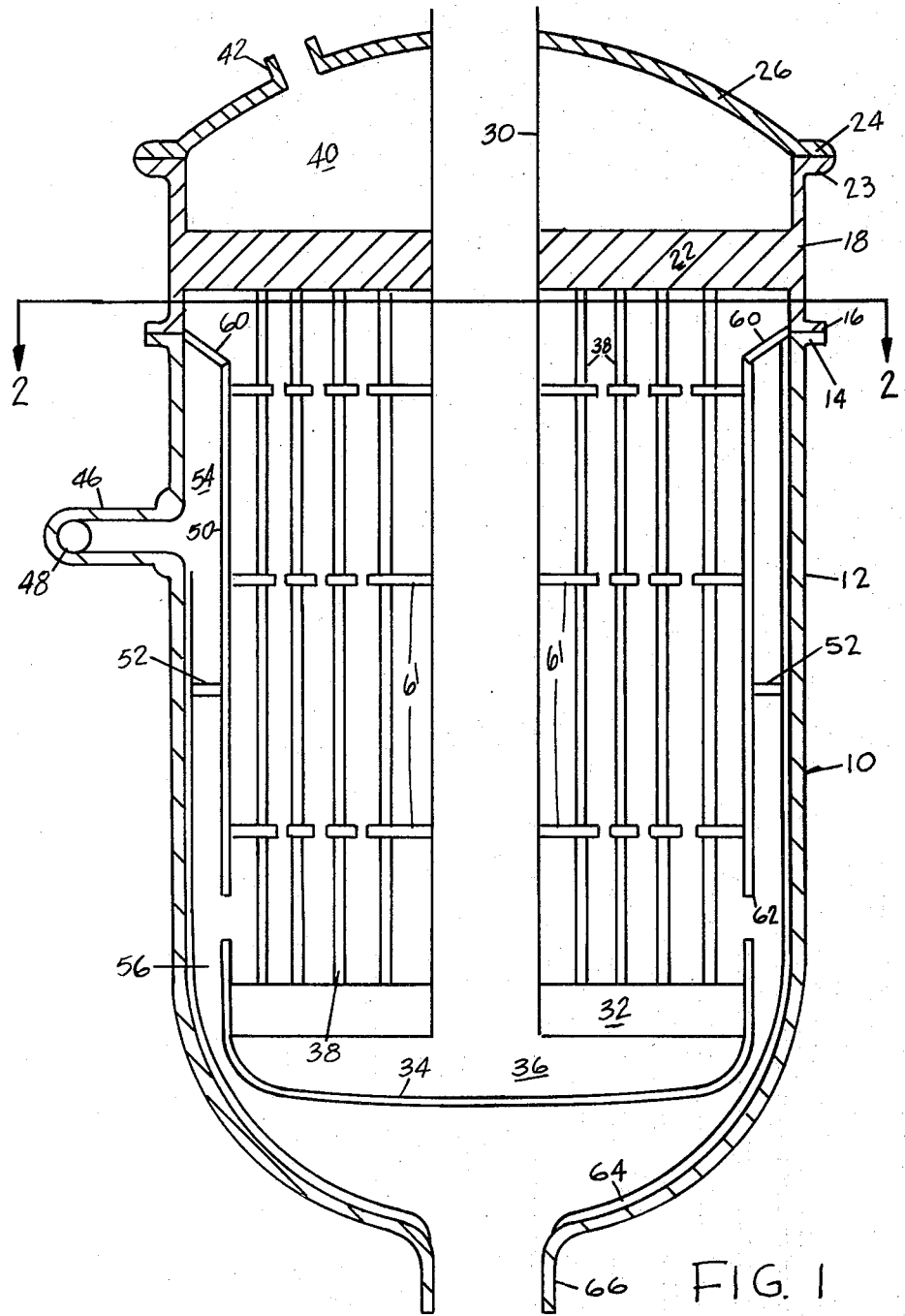
FIG. 1 is a view partly in section showing a heat exchanger made in accordance with the present invention.

There is shown in FIG. 1 a heat exchanger indicated generally at 10, having a main cylindrical shell 12 flanged at its top 14. The flange 14 is bolted to a flange 16 at the bottom of a tube sheet section 18 which consists of an annular outer ring 20 and a tube sheet 22 extending within the ring 20. At the top of the ring 20 is a flange 23 which is bolted to a flange 24 at the bottom of a cover 26 which extends across the tube sheet 22.

A central conduit 30 extends down through the cover 26 and tube sheet 22 and through a lower tube sheet 32. Plate 34 which is essentially an inverted dome extends below the tube sheet 32 to create a chamber 36 between the plate 34 and tube sheet 32.

Secondary fluid, i.e., fluid to be heated, flows down through the central conduit into the chamber 36. It then reverses its direction to flow upwardly through the tube sheet 32 and tubes 38 which extend between the tube sheet 32 and the tube sheet 22. After flowing through the tube sheet 22, the secondary fluid enters a chamber 40 which is the space between the upper tube sheet section 18 and the cover 26. The secondary fluid leaves the heat exchanger 10 through a secondary fluid outlet 42 in the cover 26.

Primary fluid enters at a primary fluid inlet 46 which is fed primary fluid through a primary fluid feed pipe 48. The fluid then impinges against an annular flow shroud 50 which extends from the tube sheet 32 to a location slightly below the upper tube sheet 22 and encircles the tubes 38.

A horizontally extending ring 52 serves as a seal and divides the space between the shroud 50 and the shell 12 into an annular flow chamber 54 and an annular lower space 56. The top of the annular flow chamber is covered by a perforated flow plate 60 which extends at an angle with respect to the shroud 50 so that it is in the shape of an inverted frustum.

Thus, primary fluid entering at 46 will flow into the annular flow chamber 54 and then upward and inward through the perforated plate 60 where it will reverse its direction to flow downward over the tubes 38 flowing through the tube support plates 61 until it reaches a level slightly above the lower tube sheet 32 where it flows outwardly through openings 62 in the shroud 50 below the ring 52. The fluid then flows through the space 56 to a chamber defined by the plate 34 and the bottom 64 of the shell 12. Thereafter, the primary fluid flows down and out of the heat exchanger 10 through the primary fluid outlet 66 in the bottom 64.

Figure 2:
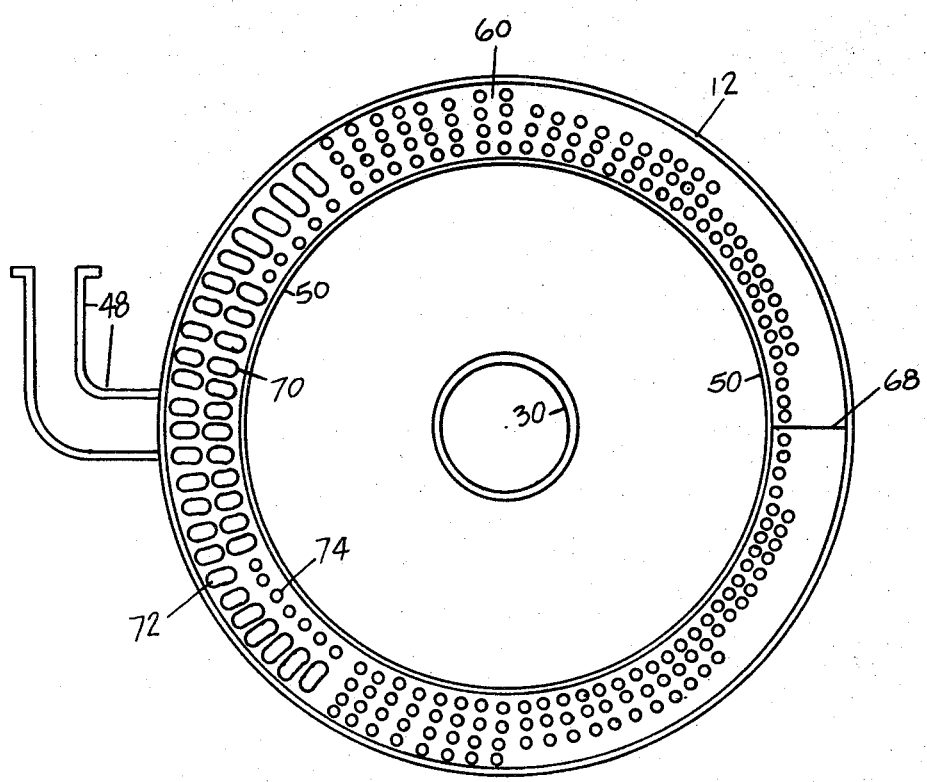
FIG. 2 is a view partly in section taken substantially along the line 2—2 of FIG. 1.

It has already been explained how problems are created when the hot primary fluid is brought into contact with cooling tubes at locations close to a tube sheet. The present invention overcomes these problems by bringing the primary fluid into the annular fluid opening 14 and then distributing it with considerable uniformity through the perforated annular plate 60. After entering at the fluid inlet 46, the primary fluid impinges against the flow shroud 50 to divide into two streams, one flowing counterclockwise and the other clockwise along either side of the annular flow chamber, both streams terminating at an end plate 68 which extends completely across the annular flow chamber 54 at a location directly opposite to the inlet 46. The fluid will lose velocity as it flows around the annular flow chamber so that the velocity will be greatest on the left side of the flow chamber, as viewed in FIG. 2, and will decrease as the fluid moves to the right, the lowest velocity being at the end plate 68. The static pressure of the primary fluid will be greatest where the velocity is less and, therefore, in order to provide for substantially uniform flow of fluids through the annular plate 60, that plate is provided with perforations which create the greatest resistance to flow at locations where the static pressure is highest. Thus, at locations in the annular flow chamber 54 which are close to the inlet 46, double rows of large elongated perforations 70 are provided. At locations farther away from the inlet 46, a single row of large perforations 72 side by side with a single row of smaller perforations 74 create a resistance which is somewhat higher. Moving away from the inlet 46, we see smaller perforations 76 which become fewer in number per unit area of the plate 60 as we move closer to the end plate 68.

It is possible that uniformity of flow through the plate 60 would require non-symmetric distribution of perforations. For instance, if the bend in primary fluid feed pipe induced a flow which did not divide fairly evenly at the flow shroud 50, the resistance through the plate 60 along one side of the line between the inlet 46 and end plate 68 must be different than on the other side for uniformity of flow through the plate 60.

In any case, it may be said that the area of the perforations per unit area of the plate 60 is roughly inversely proportional to the distance from the inlet 48. In other words the further a unit area of the plate 60 is from the inlet 48 the smaller is the quotient of the total area of the perforations in that unit area divided by the unit area.

The preferred embodiment uses a flow plate which is inclined at an angle with respect to the axis of the heat exchanger 10. It is possible that it would be either perpendicular or parallel to that axis. If this were the case, the perforations would have to be changed somewhat, but they would be arranged so that the resistance to flow through the plate would be greater the farther away from the inlet 46.

The foregoing describes but one preferred embodiment of the present invention, other embodiments being possible without exceeding the scope thereof as defined in the following claims.

What is claimed is:

1. A liquid sodium heated exchanger comprising:
a cylindrical outer shell;
a tube sheet extending perpendicular to the longitudinal axis of said outer shell;
a plurality of tubes extending downward from said tube sheet;
a liquid sodium inlet in said outer shell spaced downwardly from said tube sheet;
a liquid sodium outlet in said shell, said outlet being positioned below said tubes and below said liquid sodium inlet; and
an annular shroud defining a flow chamber, within said shell encircling said tubes and in communication with said liquid sodium inlet, said shroud having a perforated annular plate which comprises the top of said chamber and which is positioned below said tube sheet but above said inlet, seal means between the inner periphery of said shell and said shroud dividing said chamber substantially between said inlet and outlet said annular plate encircling said tubes and being perforated so that the area of the perforations per unit area of said annular plate is substantially inversely proportional to the distance of said unit area from said inlet;
whereby liquid sodium enters said flow chamber through said inlet and flows upward through said perforations and then down over said tubes to said liquid sodium outlet.

2. The heat exchanger defined in claim 1 wherein said annular plate is inclined at an angle with respect to said tube sheet so that said plate defines an inverted frustum.

3. The heat exchanger defined in claim 1 further comprising an end plate extending across said flow chamber at the location therein farthest from said inlet.

* * * * *